United States Patent
Lee et al.

[11] Patent Number: 5,940,239
[45] Date of Patent: Aug. 17, 1999

[54] VELOCITY/POSITION ESTIMATOR OF MAGNETIC HEAD IN MAGNETIC DISK DRIVING APPARATUS

[75] Inventors: Jung-Ho Lee, Seoul; Jeom-Geun Kim, Chuncheon, both of Rep. of Korea

[73] Assignee: SamSung Electronics Co., Ltd., Suwon, Rep. of Korea

[21] Appl. No.: 08/681,447

[22] Filed: Jul. 23, 1996

[30] Foreign Application Priority Data

Jul. 24, 1995 [KR] Rep. of Korea ................... 95/21904

[51] Int. Cl.⁶ .................................................. G11B 5/596
[52] U.S. Cl. .................................... 360/77.02; 360/78.09
[58] Field of Search ........................ 360/77.02, 78.04, 360/78.05, 78.07, 78.09, 78.06

[56] References Cited

U.S. PATENT DOCUMENTS

| | | |
|---|---|---|
| 3,883,894 | 5/1975 | Johnson . |
| 4,172,267 | 10/1979 | Sidman . |
| 4,677,507 | 6/1987 | Elliott . |
| 4,697,127 | 9/1987 | Stich et al. . |
| 4,794,469 | 12/1988 | Kaido et al. . |
| 4,887,173 | 12/1989 | Sengoku et al. . |
| 4,907,109 | 3/1990 | Senio . |
| 4,914,644 | 4/1990 | Chen et al. .................... 360/78.04 X |
| 4,956,593 | 9/1990 | Sakamoto et al. . |
| 4,965,501 | 10/1990 | Hashimoto . |
| 4,979,055 | 12/1990 | Squires et al. ............................ 360/69 |
| 4,988,933 | 1/1991 | Ogawa . |
| 5,010,425 | 4/1991 | Asai . |
| 5,095,471 | 3/1992 | Sidman ....................................... 369/43 |
| 5,173,647 | 12/1992 | Hashimoto ....................... 360/78.06 X |
| 5,194,788 | 3/1993 | Hashimoto . |
| 5,345,348 | 9/1994 | Suzuki . |
| 5,416,759 | 5/1995 | Chun . |
| 5,459,624 | 10/1995 | Erickson et al. ..................... 360/78.09 |
| 5,469,414 | 11/1995 | Okamura .......................... 360/78.09 X |
| 5,539,592 | 7/1996 | Banks et al. ......................... 360/78.09 |
| 5,585,976 | 12/1996 | Pham ................................. 360/78.09 X |

Primary Examiner—Aristotelis M. Psitos
Assistant Examiner—K. Wong
Attorney, Agent, or Firm—Robert E. Bushnell, Esq.

[57] ABSTRACT

A magnetic disk drive apparatus includes a velocity/position estimator of a magnetic head, in which a gain can automatically be adjusted in accordance with a moving velocity of the magnetic head. The velocity/position estimator generates a current head velocity estimated value and a current head position estimated value from a current head position predicted value, a current head velocity predicted value, a current estimated error value, a current head position estimated gain value and a current head velocity estimated gain value, wherein the current head velocity estimated value and the current head position estimated value, respectively, are determined in accordance with the current estimated error value and outputs of a subtracting unit which are respectively calculated by subtracting a velocity command value set according to a position error from the current head position estimated gain value and by subtracting the velocity command value from the current head velocity estimated gain value.

6 Claims, 3 Drawing Sheets

VELOCITY/POSITION ESTIMATOR OF MAGNETIC HEAD IN MAGNETIC DISK DRIVING APPARATUS

CLAIM OF PRIORITY

This application make reference to, incorporates the same herein, and claims all benefits accruing under 35 U.S.C. §119 from an application entitled *VELOCITY/POSITION ESTIMATOR OF MAGNETIC HEAD IN MAGNETIC DISK DRIVING APPARATUS* earlier filed in the Korean Industrial Property Office on Jul. 24, 1996 and there duly assigned Ser. No. 21904/1995.

BACKGROUND OF THE INVENTION

1. Field of the Invention

The present invention relates to a magnetic disk driving apparatus for magnetically writing and reading digital information, and more particularly, to a velocity and position estimator of a magnetic head (or a data transducer) upon a track seek.

2. Description of the Related Art

A magnetic disk driving apparatus for magnetically writing and reading data on a rotary magnetic disk can access a large amount of data at a high speed, and thus, it is widely used as an auxiliary memory of a computer system. In the magnetic disk driving apparatus, data is stored in tracks which extend radially along the magnetic disk surface. These tracks are accessed by a magnetic head for reading, writing and erasing data on the magnetic disk.

The magnetic head is moved in a radical direction along the magnetic disk surface under the control of a head position servo mechanism capable of positioning the magnetic head on any one selected track. In order to selectively position the magnetic head on a specific track, a current track position of the magnetic head must be monitored. As stated above, servo information indicative of the track position of the magnetic head is provided by using a specific servo pattern which is read from the magnetic disk surface by means of the magnetic head. The servo pattern is permanently written on the magnetic disk surface after assembly of the magnetic disk driving apparatus. Upon accessing the data on the magnetic disk surface, the servo pattern is detected by the magnetic head and used as track position information. An embedded servo method is an example of a method that provides the servo position information. In the embedded servo system, the servo information is arranged reciprocally between data intervals on the magnetic disk surface. Each portion of servo information includes track position information, a track address, and index information, as well as other information stored on the disk.

The magnetic head is positioned on a specific track by using the servo information through two steps known as track seek and track follow. The track seek step is performed by moving the magnetic head from the current track to the desired track, that is, by finding the track address of the desired track and moving the magnetic head. Also, the track follow step is performed by precisely following the specific track. Thus, when the magnetic head is positioned on a given tracks, the track follow step enables the magnetic head to follow a central line of the specific track, and thereby accurately perform a read and write operation. For example, for track following in the conventional magnetic disk driving apparatus utilizing the embedded servo method, two bursts per track are effected by providing ones written beforehand as the track position information of the servo information on each side of a central line of one track on the magnetic disk surface. As a result, an amount of deviation and a deviation status representative of the magnetic head's position relative to the center of the track can be determined from the difference value. A signal indicative of the amount of deviation and deviation status of the magnetic head is typically referred to as "a position error signal" (hereinafter, referred to as a PES). The magnetic disk driving apparatus controls the magnetic head so that it is capable of following the center of the track by utilizing the PES which has values corresponding to deviations in the position of the magnetic head with respect to the center of the track.

Sakamoto, et al., *Servo Motor Controlling Method*, U.S. Pat. No. 4,956,593, discloses a servo motor controlling method in which the gain is varied in accordance with the rotational speed of the servo motor. I have discovered however, that the gain is not correctly varied in accordance with the specific performance of either the head or its actuator.

Sidman, *Dynamic Filter For A Moving Head Disk Storage System*, U.S. Pat. No. 4,172,267, discloses a dynamic filter for a moving head disk storage system which varies the gain in response to the carriage velocity. I have found however, that Sidman teaches that the gain is reduced at a low velocity and increased at a high velocity.

Three references to Hashimoto and the Asai reference, U.S. Pat. Nos. 4,965,501 entitled *Servo Circuit*, 5,173,647 entitled *Servo Positioning Circuit*, 5,194,788 entitled *Servo Circuit*, and 5,010,425 entitled *Access Controller For Controlling The Seek Operation Of A Head Relative To A Recording Medium*, each disclose servo control systems in which the gain is varied in dependence upon various detected values which bear a relationship to the velocity. I have found however, that as with Sakamoto, et al., the gain is not accurately varied in accordance with specific relationships characterizing the position and movement of the head.

SUMMARY OF THE INVENTION

It is therefore an object of the present invention to provide an improved disk memory and process for operating the memory.

It is another object to provide a velocity/position estimator of a magnetic head, in which a gain can automatically be adjusted in accordance with a moving velocity of the magnetic head.

This and other objects can be achieved according to the principles of the present invention with a velocity and position estimator of a magnetic head for controlling a track seeking operation in a magnetic disk driving apparatus which has a first subtracting unit for subtracting a current head position estimated value from a target position value and for generating a current position error value; a velocity command generating unit for generating a velocity command value corresponding to the current head position error value; a second subtracting unit for subtracting a current head velocity estimated value from the velocity command value and for outputting the subtracted value as a current head velocity error value; a velocity control unit for generating a current velocity control value in accordance with the current head velocity error value; a head disk device for moving the magnetic head in accordance with the current head velocity control value and accordingly, outputting a current head position measured value; and a first delay unit for delaying the current velocity control value by one sample, the velocity/position estimator comprising: second and third delay units for respectively delaying by one sample the current head position estimated value and the current head velocity estimated value; a predicting unit for generating a current head position predicted value and a current head velocity predicted value from outputs of the second and third delay units, the head velocity control value, and a velocity control value delayed by one sample. A third subtracting unit subtracts the velocity command value, respectively, from preset head position/velocity estimated gain values and outputs the subtracted values as adjusted current head position/velocity estimated gain values; and an update unit generates the current head velocity estimated value and the current head position estimated value in accordance with the current head position measured value, the current head position predicted value, the current head velocity predicted value, and the adjusted head position/velocity estimated gain values.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
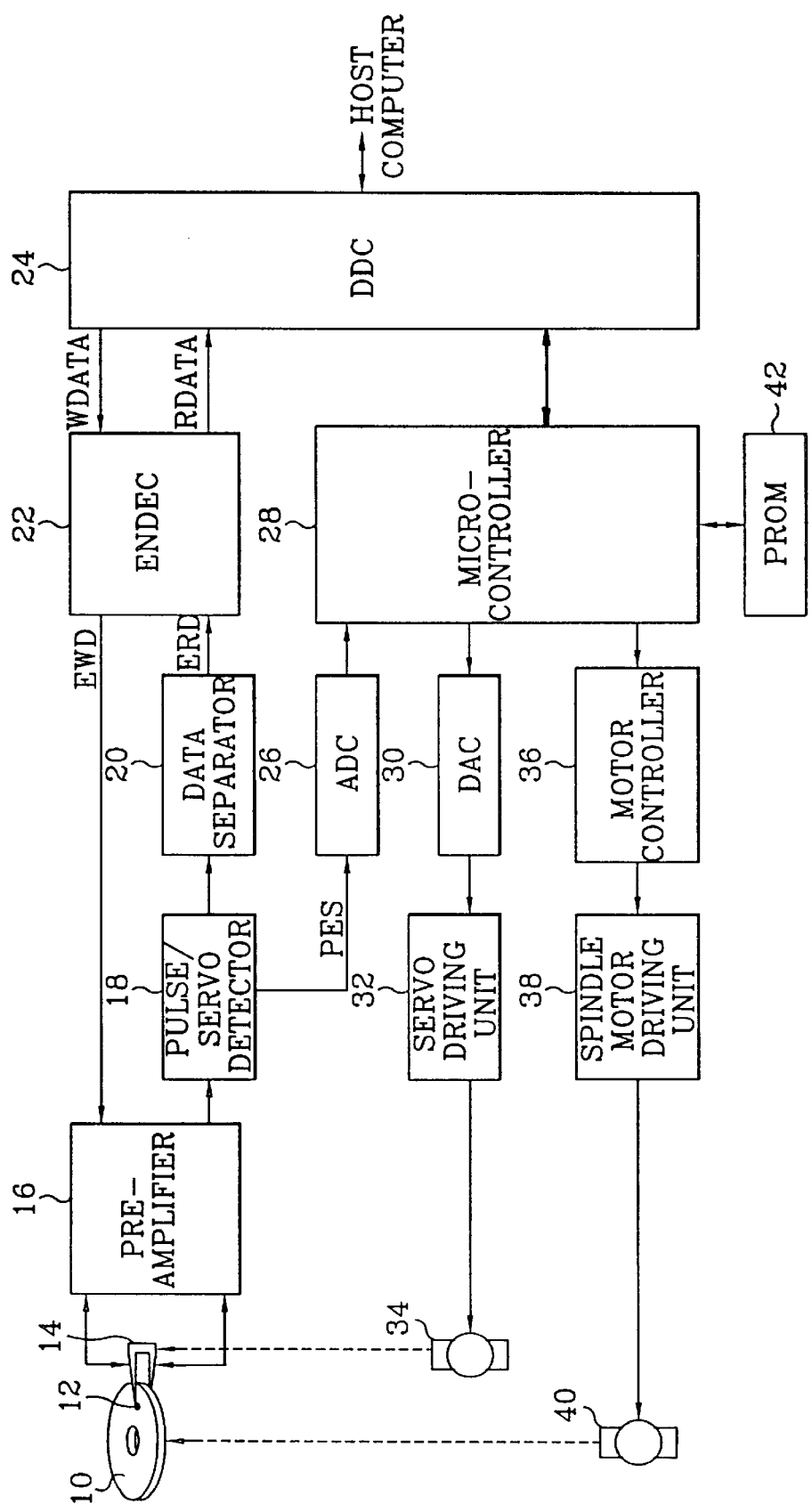
FIG. 1 is a block diagram showing an illustration of the salient features expected to be found in the construction of a hypothetical representation of a typical magnetic disk driving apparatus.

FIG. 1 is a block diagram showing the construction of a hypothetical representation of a typical magnetic disk driving apparatus, which can be used for understanding the present invention. FIG. 1 includes one disk and two heads, respectively disposed adjacent to both surfaces of the one disk. In FIG. 1, a magnetic disk 10 is rotated by a spindle motor 40. A magnetic head 12 is positioned on a surface of the magnetic disk 10 and installed at one end of an arm 14 of a rotary voice coil actuator 34. During the data read operation, a pre-amplifier 16 pre-amplifies a signal read by the magnetic head 12, and during the write data operation, enables the writing of encoded write data (hereinafter, referred to as EWD) on the surface of the magnetic disk 10 through the magnetic head 12. The EWD is generated and provided from an encoder/decoder 22 (hereinafter, referred to as an ENDEC). A pulse/servo detector 18 detects an amplified peak value of the signal pre-amplified in the preamplifier 16, and thereby generates a data pulse. Thus, the pulse/servo detector 18 detects the amplitude of two bursts and then generates a signal indicative of the difference between the amplitude levels; that is, the pulse/servo detector 18 generates the PES. The data pulse generated from the pulse/servo detector 18 is provided to a data separator 20 and the PES is provided to an analog-to digital converter 26 (hereinafter, referred to as an ADC). The ADC 26 converts the PES into a digital step value corresponding to its level, and provides the converted value to a micro-controller 28. The data separator 20 separates encoded read data (hereinafter, referred to as ERD) which is synchronized with a constant clock from the data pulse generated by the pulse/servo detector 18, and then supplies the separated data ERD to the ENDEC 22. The ENDEC 22 decodes the ERD received from the data separator 20 and provides the result as read data (hereinafter, referred to as RDATA) to a disk data controller 24 (hereinafter, referred to as a DDC). Alternatively, the ENDEC 22 also encodes written data (hereinafter, referred to as WDATA) provided from the DDC 24 and then supplies the encoded data EWD to the pre-amplifier 16. The DDC 24 is controlled by the micro-controller 28 and writes the data received from a host computer on the surface of the magnetic disk 10 via the ENDEC 22 and the pre-amplifier 16. Alternatively, the DDC 24 also reads data from the magnetic disk 10 and sends the read data inputted through the ENDEC 22 to the host computer. Further, the DDC 24 acts as an interface for communication between the host computer and the micro-controller 28. The micro-controller 28 controls the DDC 24 and controls track seeking and track following operations, in response to a read/write command received from the host computer. The micro-controller 28 controls the aforementioned track following operation by using the PES value supplied from the ADC 26. The digital-to-analog converter (hereinafter, referred to as a DAC) 30 converts a control value, generated by the micro-controller 28 to control the position of the magnetic head 12, into an analog signal. A servo driving unit 32 generates an electric current for driving the actuator 34 by a signal supplied from the DAC 30 and supplies the electric current to the voice coil of the actuator 34. The actuator 34 moves the magnetic head 12 along the surface of the magnetic disk 10 in correspondence with a direction or a level of the electric current supplied from the servo driving unit 32. A motor controller 36 controls a spindle motor driving unit 38 in accordance with a control value generated by the micro-controller 28 to control the rotation of the magnetic disk 10. The spindle motor driving unit 38 drives the spindle motor 40 under the control of the motor controller 36 to rotate the magnetic disk 10. A programmable read only memory 42 (hereinafter, referred to as a PROM) stores all of kinds of data for performing the servo control operation of the micro-controller 28.

Figure 2:
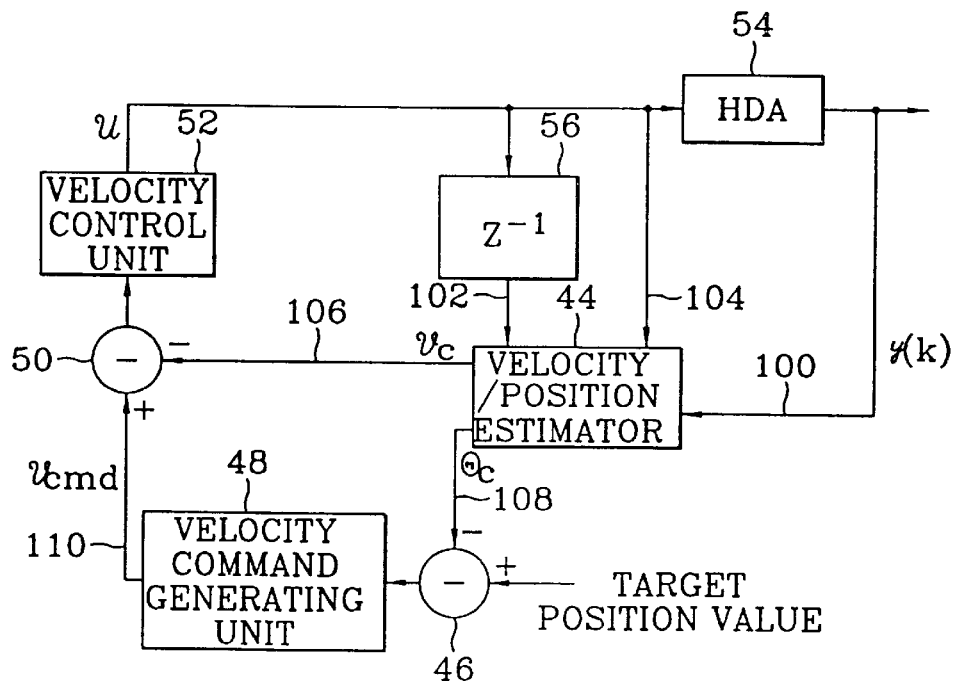
FIG. 2 is a block diagram showing an illustration of the salient features expected to be found in a track seek control arrangement.

FIG. 2 is a block diagram showing a general track seek control arrangement, which has been used for controlling the track seeking operation in the magnetic disk driving apparatus as described above. In FIG. 2, a head disk assembly 54 (hereinafter, referred to as a HDA) is comprised of the magnetic disk 10, the magnetic head 12, the arm 14 of the actuator 34, the pre-amplifier 16, the DAC 30, the servo driving unit 32, and the actuator 34 in FIG. 1. Furthermore, a velocity command generating unit 48 is included with a look-up table in the PROM 42 and the rest of blocks of FIG. 2, for instance, a velocity/position estimator 44, first and second subtracting units 46 and 50, a velocity control unit 52, and a first delay unit 56, are provided with an algorithm programmed by the micro-controller 28. The velocity/position estimator 44 estimates a velocity/position of the magnetic head 12 by a current head position measured value y(k) supplied by the HDA 54, a current velocity control value u generated by the velocity control unit 52 and a value supplied by the first delay unit 56, to thereby generate a current head velocity estimated value $\upsilon_c$ and a current head position estimated value $\theta_c$. Here, the current head position measured value y(k) is indicated as a track address and the PES read by the magnetic head 12 of the HDA 54. Generally, the track address is a gray code written on the surface of the magnetic disk 10 and, upon being read on the surface of the magnetic head 10, is provided to the micro-controller 28 by decoding. The first subtracting unit 46 subtracts the current head position estimated value $\theta_c$ from a target position value, and supplies a difference between the these two values, i.e., a position error value, to the velocity command generating unit 48. The velocity command generating unit 48 generates a velocity command value $\upsilon_{cmd}$ corresponding to the position error value selected from among a plurality of velocity command values stored in the look-up table. Likewise, the second subtracting unit 50 subtracts the current head velocity estimated value $\theta_c$ from the velocity command value $\theta_{cmd}$, and supplies a difference between these two values, i.e., a velocity error value, to the velocity control unit 52. The velocity control unit 52 generates the current velocity control value u in accordance with the velocity error value and provides the generated value to the DAC 30 of the HDA 54. The first delay unit 56 delays the current velocity control value u by 1 sample and provides the delayed value to the velocity/position estimator 44.

Since only the position information obtained by the PES exists as the measurable information in an HDA during the track seeking operation, it results in problems in that, when the velocity information required for controlling the velocity during the track seeking operation is obtained by differentiating the position information, the obtained velocity information may be sensitive to external noise, thereby deteriorating the preciseness of the velocity information. Accordingly, in controlling the track seek operation of most of hard disk drives (hereinafter, referred to as HDD's), the velocity/position information can be obtained by constituting the estimator by using an exact model and estimated position information with respect to the HDA.

Now, referring to the construction of the velocity/position estimator 44, the dynamics of the HDA 54 can be represented by the following expressions (1) and (2).

$$x(k+1)=Ax(k)+Bu(k) \tag{1}$$

$$y(k)=Cx(k) \tag{2}$$

From the above expressions (1) and (2), A, B, and C, respectively, can be expressed by the following expressions (3), (4) and (5).

$$A = \begin{bmatrix} 1 & 1 & kd \\ 0 & 1 & 2kd \\ 0 & 0 & 1 \end{bmatrix} \tag{3}$$

$$B = \begin{bmatrix} kd \\ 2kd \\ 0 \end{bmatrix} \tag{4}$$

$$c = [1\ 0\ 0] \tag{5}$$

Also, x(k) can be expressed by the following expression (6).

$$x(k) = \begin{bmatrix} \theta(k) \\ \upsilon(k) \\ \omega(k) \end{bmatrix} \tag{6}$$

In the above expression (6), $\theta(k)$ represents a position, $\upsilon(k)$ represents a velocity and $\omega(k)$ represents a bias.

Figure 3:
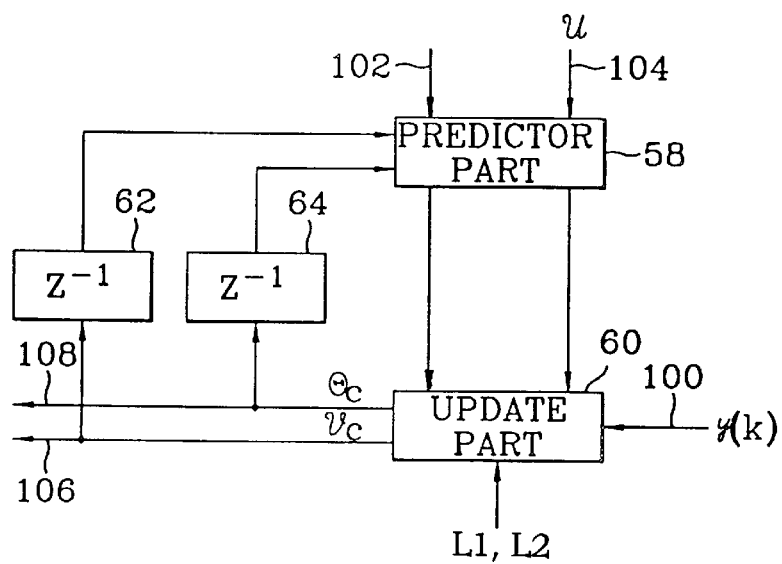
FIG. 3 is a block diagram showing an illustration of the salient features expected to be found in the algorithm of a general velocity/position estimator.

Meanwhile, FIG. 3 is a block diagram showing the arrangement of a general velocity/position estimator, in which the velocity/position estimator 44 is comprised of a predictor part 58 and an update part 60. In FIG. 3, signal lines 100, 102, 104, 106, and 108 are same as those of FIG. 2. Herein, the predictor part 58 receives outputs of second and third delay units 62 and 64 and outputs of the velocity control unit 52 and the first delay unit 56, to obtain a predicted state value $x_p(k)$ and a predicted output value $y_p(k)$, respectively, as shown by the following expressions (7) and (8).

$$x_p(k)=Ax(k-1)+Bu(k-1) \tag{7}$$

$$y_p(k)=Cx_p(k) \tag{8}$$

The update part 60 generates the current head position measured value y(k) applied from the HDA 54, the current head velocity estimated value $\upsilon_p$ applied from the predictor part 58, and the current head velocity estimated value $u_c$ and the current head position estimated value $\theta_c$ supplied by the current head position predicted value $\theta_p$. An update state value $x_c(k)$ of the update part 60 can be represented by the following expression (9).

$$x_c(k)=x_p(k)+(-L)[y(k)-y_p(k)] \tag{9}$$

Herein, since a delay time exists in a digital embodiment, the bias value $\omega(k)$ of the estimated values is removed to obtain the following final expressions (10) and (11) for the predictor part 58 and the update part 60.

$$\begin{bmatrix} \theta_p \\ \upsilon_p \end{bmatrix} = \begin{bmatrix} 1 & 1 \\ 0 & 1 \end{bmatrix}\begin{bmatrix} \theta_c \\ \upsilon_c \end{bmatrix} + \begin{bmatrix} 2kd2-kd1 \\ 2kd2 \end{bmatrix}[u(k-1)+\hat{\omega}] + \begin{bmatrix} kd+kd1-2kd2 \\ 2kd-2kd2 \end{bmatrix}[u(k)+\hat{\omega}] \tag{10}$$

$$\begin{bmatrix} \theta_c \\ \upsilon_c \end{bmatrix} = \begin{bmatrix} \theta_p \\ \upsilon_p \end{bmatrix} + \begin{bmatrix} L1 \\ L2 \end{bmatrix}[y(k)-\theta_p(k)] \tag{11}$$

In the above expression (11), $\theta_c$ represents the current head position estimated value, $\upsilon_c$ represents the current head velocity estimated value, and $\theta_p$ represents the current head position predicted value, $\upsilon_p$ represents the current head velocity predicted value, L1 represents the head position estimated gain value, L2 represents the head velocity estimated gain value, y(k) represents the current head position measured value, and $\theta_p(k)$ represents the current head position predicted value. Hence, $[y(k)-\theta_p(k)]$ is a current estimated error value.

While current gain values L1 and L2 of the velocity/position estimator as stated above use a polar arraying method, an optimum value varies depending on the preciseness of the current head position measured value y(k). For example, as seen from the above expression (11), the current gain values L1 and L2 in the prior art are constant. Thus, when the moving velocity of the magnetic head becomes high, the current head position measured value y(k) includes a noise. Eventually, it results in a problem in that the noise can be amplified and the current head position estimated value $\theta_c$ and the current head velocity estimated value $u_c$ can generate errors.

Now, a preferred embodiment of the present invention will be described in detail with reference to the accompanying drawings. Throughout the drawings, it is noted that the same reference numerals or letters will be used to designate like or equivalent elements having the same function. In the following description, numeral specific details such as components composing a concrete circuit, expressions are set forth to provide a more through understanding of the present invention. It will be apparent, however, to one skilled in the art that the invention may be practiced without their specific details. The detailed descriptions of known functions and constructions unnecessarily obscuring the subject matter of the present invention have been omitted for clarity.

Figure 4:
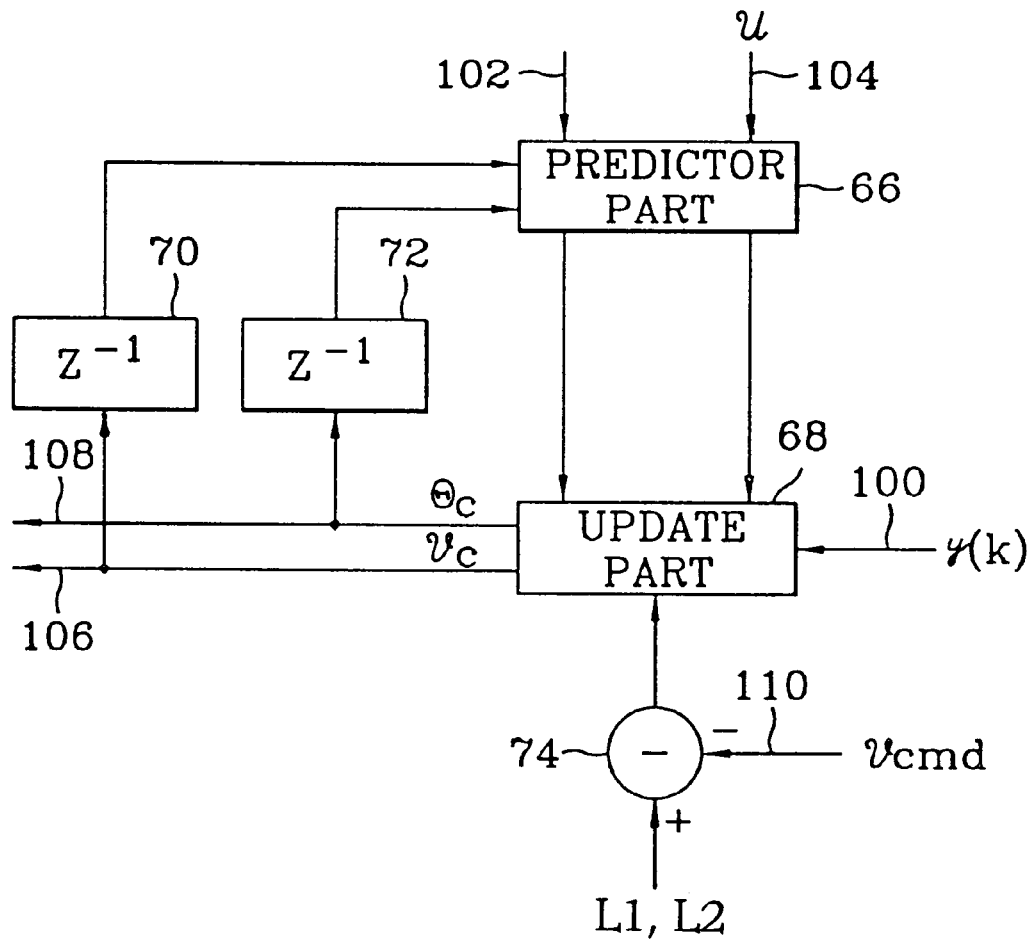
FIG. 4 is a block diagram showing the arrangement of a state estimator constructed according to the principles of the present invention.

FIG. 4 is a block diagram showing the arrangement of a state estimator according to the present invention. In FIG, 4, the signal lines 100, 102, 104, 106, and 108 are same as those of FIG. 2. A predictor part 66 receives outputs of second and third delay units 70 and 72 for respectively delaying by 1 sample a current head velocity estimated value $\upsilon_c$ and a current head position estimated value $\theta_c$, and outputs of a velocity control unit 52 and a first delay unit 56, generates a current head velocity predicted value $\theta_p$ and a current head position predicted value $\theta_p$, and supplies the result to an update part 68, as shown by the above expression (10). A subtractor unit 74 subtracts a velocity command value $\upsilon_{cmd}$ of a velocity command generating unit 48 from gain values L1 and L2 and supplies the result to the update part 68. Thus, the update part 68 generates the current head velocity estimated value $\upsilon_c$ and the current head position estimated value $\theta_c$ as shown by the following expression (12), by a current head position measured value y(k) supplied from a HDA 54, the current head velocity predicted value $\upsilon_p$ and the current head position predicted value $\theta_p$ supplied from the predictor part 66, and the output of the subtracting unit 74.

$$\begin{bmatrix} \theta_c \\ \upsilon_c \end{bmatrix} = \begin{bmatrix} \theta_p \\ \upsilon_p \end{bmatrix} + \begin{bmatrix} L1 - \upsilon_{cmd} \\ L2 - \upsilon_{cmd} \end{bmatrix} [y(k) - \theta_p(k)] \qquad (12)$$

In the velocity/position estimator as described above, the gain thereof is automatically adjusted in accordance with the moving velocity of the magnetic head. That is, when the moving velocity of the magnetic head is high, an estimated error has a high possibility of being contained in the track position information or burst values obtained through the magnetic head. Accordingly, the gain is decreased, thereby improving the accuracy of the estimated error. However, when the is preciseness of the estimated value is high due to a low moving velocity of the magnetic head, the gain is increased, thereby improving the estimated error accuracy. For example, when the velocity command value $u_{cmd}$ is high when the moving velocity of the magnetic head is high, the gain value supplied and adjusted from the subtracting unit 74 to the update part 68, namely, L1-$u_{cmd}$ and L2-$u_{cmd}$ in the above expression (12) becomes low. On the other hand, when the velocity command value $u_{cmd}$ is small when the moving velocity of the magnetic head is low, the gain value supplied and adjusted from the subtracting unit 74 to the update part 68, namely, L1-$u_{cmd}$ and L2-$u_{cmd}$ in the above expression (12) becomes high. Consequentially, according to the present invention, the gain of the velocity/position estimator can be automatically maintained to be optimum in accordance with the moving velocity of the magnetic head.

Namely, while the current head position/velocity estimated gain values L1 and L2 in the prior art, which are constant as seen from the above expression (11), are supplied as is to the update part 60, the current head position/ velocity estimated gain values L1 and L2, as seen from the above expression (12) according to the present invention, are variable and are adjusted in accordance with the velocity command value $u_{cmd}$.

The present invention has illustrated the case of adjusting the current head position/velocity estimated gain values L1 and L2 in accordance with the velocity command value $u_{cmd}$ in comparison with the current head position estimated value $\theta_c$ and the current head velocity estimated value $u_c$, but only one of the head velocity and head position can be adjusted and embodied to the present invention as the need arises.

As set forth, the present invention has an advantage in that the gain of the velocity/position estimator can be automatically maintained so as to be optimum in accordance with the moving velocity of the magnetic head.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. A magnetic disk driving apparatus comprising: a position estimator for generating a current head position estimated value $\theta_c$ from a predicted current head position value $\theta_p$, a current estimated error value $\{y(k)-\theta_p(k)\}$ and a current head position estimated gain value $L_1$, said position estimator determining said current head position estimated value $\theta_c$ in accordance with said predicted current head position value $\theta_p$ and said estimated error value $\{y(k)-\theta_p(k)\}$ and an output of a subtracting unit which subtracts a velocity command value $\upsilon_{cmd}$ set according to a position error from said current head position estimated gain value $L_1$ in accordance with the following expression:

$$\{\theta_c\}=\{\theta_p\}+\{L_1-\theta_{cmd}\}\{y(k)-\theta_p(k)\}$$

wherein, y(k) represents a measured current head position value and $\theta_p(k)$ represents a current head position predicted value; said position estimator comprising:
a receiving means for receiving said current head position predicted value $\theta_p$, said measured current head position value y(k), said current head position predicted value $\theta_p(k)$, said current head position estimated gain value $L_1$ and said velocity command value $\upsilon_{cmd}$;
a first subtractor for subtracting said current head position predicted value $\theta_p(k)$ from said measured current head position value y(k);
a second subtractor for subtracting said velocity command value $\epsilon_{cmd}$ from said current head position estimated gain value $L_1$;
a multiplier for multiplying an output of said second subtractor by an output of said first subtractor; and
an adder for adding an output of said multiplier to said current head position predicted value $\theta_p$, an output of said adder corresponding to said current head position estimated value $\theta_c$.

2. A magnetic disk driving apparatus comprising: a velocity estimator for generating a current head velocity estimated value $\upsilon_c$ from a predicted current head velocity value $\upsilon_p$, a current estimated error value $\{y(k)-\theta_p(k)\}$ and a current head velocity estimated gain value $L_2$, said velocity estimator determining said current head velocity estimated value $v_c$ in accordance with said predicted current head velocity value $v_p$ and said current estimated error value $\{y(k)-\theta_p(k)\}$ and an output of a subtracting unit which subtracts a velocity command value $v_{cmd}$ set according to a position error from said current head velocity estimated gain value $L_2$ in accordance with the following expression:

$$\{v_c\}=\{v_p\}+\{L_2-v_{cmd}\}\{y(k)-\theta_p(k)\}$$

wherein, y(k) represents a measured current head position value and $\theta_p(k)$ represents a current head position predicted value; said velocity estimator comprising:
   a receiving means for receiving said current head velocity predicted value $v_p$, said measured current head position value y(k), said current head velocity predicted value $v_p(k)$, said current head position estimated gain value $L_1$ and said velocity command value $v_{cmd}$;
   a first subtractor for subtracting said current head velocity predicted value $v_p(k)$ from said measured current head position value y(k);
   a second subtractor for subtracting said velocity command value $v_{cmd}$ from said current velocity estimated gain value $L_2$;
   a multiplier for multiplying an output of said second subtractor by an output of said first subtractor; and
   an adder for adding an output of said multiplier to said current head velocity predicted value $v_c$, an output of said adder corresponding to said current head velocity estimated value $v_c$.

3. A magnetic disk driving apparatus comprising: a velocity and position estimator for generating both a current head velocity estimated value $v_c$ and a current head position estimated value $\theta_c$ from a current head position predicted value $\theta_p$, a current head velocity predicted value, a current estimated error value $\{y(k)-\theta_p p(k)\}$, a current head position estimated gain value $L_1$ and a current head velocity estimated gain value $L_2$, said velocity position estimator determining said current head velocity estimated value $v_c$ and said current head position estimated value $\theta_c$, respectively, in accordance with said predicted current head velocity and position values $v_c$ and $\theta_p$ and said current estimated error value $\{y(k)-\theta_p(k)\}$ and outputs of a subtracting unit which respectively subtracts a velocity command value $v_{cmd}$ set according to a position error from said current head position estimated gain value L1 and subtracts said velocity command value $v_{cmd}$ from said current head velocity estimated gain value L2 in accordance with the following expression:

$$\left\{\begin{array}{c}\theta_c\\v_c\end{array}\right\}=\left\{\begin{array}{c}\theta_p\\v_p\end{array}\right\}+\left\{\begin{array}{c}L1-v_{cmd}\\L2-v_{cmd}\end{array}\right\}\{y(k)-\theta_p(k)\}$$

wherein, y(k) represents a measured current head position value and $\theta_p(k)$ represents a current head position predicted value; said position estimator comprising:
   a receiving means for receiving said current head position predicted value $\theta_p$, said measured current head position value y(k), said current head position predicted value $\theta_p(k)$, said current head position estimated gain value $L_1$ and said velocity command value $v_{cmd}$;
   a first subtractor for subtracting said current head position predicted value $\theta_p(k)$ from said measured current head position value y(k);
   a second subtractor for subtracting said velocity command value $v_{cmd}$ from said current head position estimated gain value $L_1$;
   a multiplier for multiplying an output of said second subtractor by an output of said first subtractor; and
   an adder for adding an output of said multiplier to said current head position predicted value $\theta_p$, an output of said adder corresponding to said current head position estimated value $\theta_c$;
said velocity estimator comprising:
   a receiving means for receiving said current head velocity predicted value $v_p$, said measured current head position value y(k), said current head velocity predicted value $v_p(k)$, said current head position estimated gain value $L_1$ and said velocity command value $v_{cmd}$;
   a first subtractor for subtracting said current head velocity predicted value $v_p(k)$ from said measured current head position value y(k);
   a second subtractor for subtracting said velocity command value $v_{cmd}$ from said current velocity estimated gain value $L_2$;
   a multiplier for multiplying an output of said second subtractor by an output of said first subtractor; and
   an adder for adding an output of said multiplier to said current head velocity predicted value $v_p$, an output of said adder corresponding to said current head velocity estimated value $v_c$.

4. A method of generating a current head position estimated value $\theta_c$ in a position estimator of a magnetic disk drive apparatus from a current head position predicted value $\theta_p$, a current estimated error value $\{y(k)-\theta_p(k)\}$ and a current head position estimated gain value $L_1$, said current head position estimated value $\theta_c$ being determined in accordance with said current head position predicted value $\theta_p$ and said current estimated error value $\{y(k)-\theta_p(k)\}$ and the difference between a velocity command value $v_{cmd}$ set according to a position error and said current head position estimated gain value $L_1$ in accordance with the following expression:

$$\{\theta_c\}=\{\theta_p\}+\{L_1-v_{cmd}\}\{y(k)-\theta_p(k)\}$$

wherein, y(k) represents a measured current head position value and $\theta_p(k)$ represents a current head position predicted value.

5. A method of generating a current head velocity estimated value $v_c$ in a velocity estimator of a magnetic disk drive apparatus from a current head velocity predicted value $v_p$, a current estimated error value $\{y(k)-\theta_p(k)\}$ and a current head velocity estimated gain value $L_2$, said current head velocity estimated value $v_c$ being determined in accordance with said current head velocity predicted value $v_p$ and said current estimated error value $\{y(k)-\theta_p(k)\}$ and the difference between a velocity command value $v_{cmd}$ set according to a position error and said current head velocity estimated gain value $L_2$ in accordance with the following expression:

$$\{v_c\}=\{v_p\}+\{L_2-v_{cmd}\}\{y(k)-\theta_p(k)\}$$

wherein, y(k) represents a measured current head position value and $\theta_p(k)$ represents a current head position predicted value.

6. A method of generating a current head velocity estimated value $v_c$ and a current head position estimated value $\theta_c$ in a velocity and position estimator of a magnetic disk drive apparatus from a current head position predicted value $\theta_p$, a current head velocity predicted value $v_p$, a current estimated error value $\{y(k)-\theta_p(k)\}$, a current head position estimated gain value $L_1$ and a current head velocity estimated gain value $L_2$, said current head velocity estimated value $v_c$ and said current head position estimated value $\theta_c$, respectively, being determined in accordance with said predicted current head velocity and position values $v_c$ and $\theta_p$ and said current estimated error value $\{y(k)-\theta_p(k)\}$ and respectively the difference between a velocity command value $v_{cmd}$ set according to a position error from said current head position estimated gain value $L_1$ and the difference between said velocity command value $v_{cmd}$ and said current head velocity estimated gain value $L_2$ in accordance with the following expression:

$$\begin{Bmatrix} \theta_c \\ v_c \end{Bmatrix} = \begin{Bmatrix} \theta_p \\ v_p \end{Bmatrix} + \begin{Bmatrix} L1 - v_{cmd} \\ L2 - v_{cmd} \end{Bmatrix} \{y(k) - \theta_p(k)\}$$

wherein, $y(k)$ represents a measured current head position value and $\theta_p(k)$ represents a current head position predicted value.

* * * * *